(12) United States Patent
Okamitsu et al.

(10) Patent No.: US 7,037,460 B2
(45) Date of Patent: *May 2, 2006

(54) FREE RADICAL POLYMERIZATION METHOD HAVING REDUCED PREMATURE TERMINATION, APPARATUS FOR PERFORMING THE METHOD, AND PRODUCT FORMED THEREBY

(75) Inventors: Jeffrey K. Okamitsu, Westminster, MD (US); A. David P. Harbourne, Potomac, MD (US); Sonny Jonsson, Stockholm (SE); Rong Bao, Rockville, MD (US)

(73) Assignee: Fusion UV Systems, Inc., Gaithersburg, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/929,556

(22) Filed: Aug. 31, 2004

(65) Prior Publication Data

US 2005/0032926 A1    Feb. 10, 2005

Related U.S. Application Data

(63) Continuation of application No. 09/983,208, filed on Oct. 23, 2001.

(60) Provisional application No. 60/300,816, filed on Jun. 27, 2001.

(51) Int. Cl.
*C08F 2/46* (2006.01)
*B29C 35/08* (2006.01)
*G21G 1/12* (2006.01)

(52) U.S. Cl. .............. 264/494; 522/1; 522/6; 522/104; 522/120; 522/121; 522/122; 522/182; 425/174.4; 425/174; 204/157.15; 204/157.6; 204/157.63; 250/493.1; 250/522.1

(58) Field of Classification Search ............. 522/1, 522/6, 104, 120, 121, 122, 182; 264/494; 425/174.4, 174; 204/157.15, 157.6, 157.63; 250/493.1, 522.1

See application file for complete search history.

(56) References Cited

U.S. PATENT DOCUMENTS

| | | |
|---|---|---|
| 3,997,816 A | 12/1976 | Haugsjaa et al. |
| 4,042,850 A | 8/1977 | Ury et al. |
| 4,053,814 A | 10/1977 | Regan et al. |
| 4,063,132 A | 12/1977 | Proud et al. |
| 4,185,228 A | 1/1980 | Regan |
| 4,359,668 A | 11/1982 | Ury |
| 4,504,768 A | 3/1985 | Ury et al. |
| 4,548,688 A | 10/1985 | Matthews |
| 4,721,888 A | 1/1988 | Proud et al. |
| 4,812,714 A | 3/1989 | Keefe et al. |
| 4,859,906 A | 8/1989 | Ury et al. |
| 4,886,840 A | 12/1989 | Mukohyama et al. |
| 5,039,918 A | 8/1991 | Ohtake et al. |
| 5,051,663 A | 9/1991 | Ury et al. |
| 5,144,199 A | 9/1992 | Taki et al. |
| 5,171,609 A | 12/1992 | Ury |
| 5,233,283 A | 8/1993 | Kennedy |
| 5,248,273 A | 9/1993 | Nortrup et al. |
| 5,300,331 A | 4/1994 | Schaeffer |
| 5,323,087 A | 6/1994 | Zaslavsky et al. |
| 5,323,091 A | 6/1994 | Morris |
| 5,391,406 A | 2/1995 | Ramharack et al. |
| 5,402,516 A | 3/1995 | Blyler et al. |
| 5,416,127 A | 5/1995 | Chandran et al. |
| 5,440,137 A | 8/1995 | Sowers |
| 5,446,073 A | 8/1995 | Jonsson et al. |
| 5,504,391 A | 4/1996 | Turner et al. |
| 5,536,759 A | 7/1996 | Ramharack et al. |
| 5,594,303 A | 1/1997 | Simpson et al. |
| 5,655,312 A | 8/1997 | Sevcik |
| 5,686,793 A | 11/1997 | Turner et al. |
| 5,864,388 A | 1/1999 | Shima et al. |
| 6,025,409 A | 2/2000 | Jansen |
| 6,133,694 A | 10/2000 | Cekic et al. |
| 6,472,452 B1 | 10/2002 | Ruepping |

FOREIGN PATENT DOCUMENTS

WO    WO 01/05585    1/2001

OTHER PUBLICATIONS

International Preliminary Examination Report mailed Aug. 31, 2004, for International (PCT) Application No. PCT/US02/16652.

R.W. Stone, Recent Developments in Microwave Energized UV Curing Lamps. Fusion UV Curing Systems, Rockville, Maryland, Oct. 1992, pp. 1-14.

R.W. Stone, Practical Relationships Between UV Lamps and the Curing Process Window; Fusion UV Curing Systems, Inc., Rockville, Maryland, Published in Conference Proceedings, RadTech International North America, May 1994, pp. 307-313.

International Search Report mailed Nov. 5, 2002, for International (PCT) Application No. PCT/US02/16652.

*Primary Examiner*—Sanza L. McClendon
(74) *Attorney, Agent, or Firm*—Finnegan, Henderson Farabow, Garrett & Dunner, L.L.P.

(57) ABSTRACT

A method of polymerizing by a free radical polymerization mechanism, product formed thereby, and apparatus for performing this method, are disclosed. The composition to be polymerized by the free radical polymerization mechanism is irradiated by a substantially constant radiation, the radiation being substantially without pulsation. The use of the substantially constant radiation without pulsation reduces premature termination of the polymerization. The substantially constant radiation can be the output of a lamp powered by a constant current, direct current power supply.

11 Claims, 2 Drawing Sheets

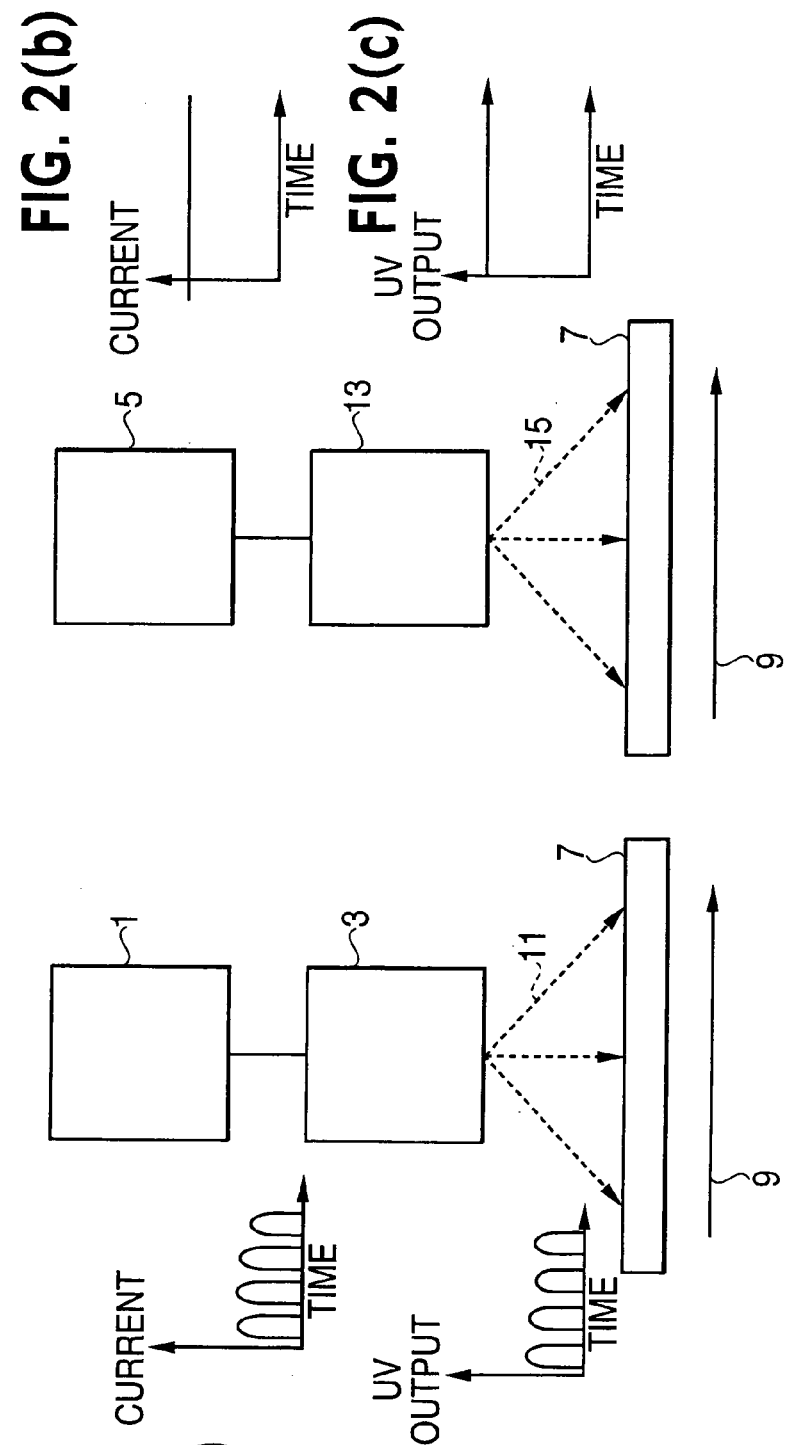

FREE RADICAL POLYMERIZATION METHOD HAVING REDUCED PREMATURE TERMINATION, APPARATUS FOR PERFORMING THE METHOD, AND PRODUCT FORMED THEREBY

CROSS-REFERENCE TO RELATED APPLICATIONS

This application is a Continuation application of prior application Ser. No. 09/983,208, filed Oct. 23, 2001, the contents of which are incorporated herein by reference in their entirety, which Ser. No. 09/983,208 claims the benefit under 35 USC 119(e)(1) of provisional application Ser. No. 60/300,816, filed Jun. 27, 2001.

BACKGROUND

The present invention is directed to a polymerization method, wherein the polymerization occurs by a free radical polymerization mechanism, to apparatus used for this method, and to the polymerization product produced by this method, and particularly wherein premature termination of the polymerization is reduced. The present invention is applicable to polymerization of materials wherein the polymerization mechanism is a free radical polymerization, without limitation to the material being polymerized, and is applicable, for example, in the polymerization of materials with C=C double bonds where the polymerization is by a free radical polymerization mechanism, initiated by irradiation with, e.g., light (such as ultraviolet light).

In a conventional photoinitiated, free radical polymerization process, using, for example, a microwave driven, electrodeless ultraviolet lamp, the microwaves are produced utilizing rectified alternating current, or a pulsed power supply. These microwaves produce pulsed ultraviolet light from the electrodeless ultraviolet lamp, as the photoinitiating light. That is, the rectified alternating current or pulsed power supply produces a pulsed light output from the lamp for photoinitiation of the polymerization. However, this conventional process forms a product with an undesirably low molecular weight, and has an undesirably low yield.

Thus, it is desired to form a polymerization product, produced by a free radical polymerization mechanism, having increased yield and increased molecular weight, with a narrower distribution in molecular weight of the product (polymer) formed, while being formed at a relatively high speed. That is, it is desired to improve the product produced by a free radical polymerization mechanism initiated by radiation (e.g., light, such as ultraviolet light), both in yield (increased yield), and in molecular weight of the product formed (increased molecular weight) and decreased distribution (range) in the formed product.

SUMMARY

The present inventors have found that premature termination of the free radical polymerization, causing disadvantageously low yield and products of disadvantageously low molecular weight, is attributable to the pulsed optical output providing photoinitiation of the free radical polymerization. Based on this finding, the present invention applies constant radiation (e.g., light), for example, constant light intensity, over time, during the polymerization process, to, e.g., initiate the polymerization (to provide the photoinitiation) and sustain the polymerization.

Moreover, according to the present invention, the constant light output can be achieved by use of a constant output (temporally), direct current power supply. For example, and not to be limiting, the constant output (e.g., constant current) direct current power supply can be used for generating microwaves for driving a microwave-powered lamp, which produces a constant(uniform) continuous light output, over time, for photoinitiation, thereby reducing premature termination. According to aspects of the present invention, the constant (uniform) current, direct current power supply, for example, can be used to provide a constant current, over time, applied to a magnetron to generate, e.g., the microwaves driving the lamp, which microwaves produce a constant light output from the lamp (electrodeless lamp) to cause polymerization to proceed. By providing a constant light output (constant intensity, having no ripple), premature termination is reduced and undesirable effects arising due to premature termination are at least reduced.

As another example, a constant output (e.g., constant current) direct current power supply can be used to power an arc lamp to produce a constant (uniform) continuous light output (constant intensity, having no ripple), over time, for photoinitiation, thereby reducing premature termination.

Accordingly, an improved polymer product can be formed, having improved properties, and higher molecular weight and decreased distribution (range) of molecular weights, and the polymer product can be produced at higher speeds (e.g., when forming a sheet material, the cured product can be formed at higher line speeds).

BRIEF DESCRIPTION OF THE DRAWINGS

FIG. 1(a) schematically shows a system for curing (polymerizing) a polymer according to a convention technique, using a microwave driven ultraviolet (UV) lamp to supply energy for initiating the polymerization and a rectified alternating current or pulsed direct current power supply in generating the microwaves, with FIG. 1(b) showing the current output as a function of time for the power supply for generating the microwaves for driving the microwave driven UV lamp, and with FIG. 1(c) showing the UV light output of the lamp as a function of time.

FIG. 2(a) schematically shows a system for curing (polymerizing) a polymer according to an illustrative embodiment of the present invention, using a microwave driven ultraviolet lamp to supply energy for initiating the polymerization and a direct current power supply in generating the microwaves, with FIG. 2(b) showing the current output as a function of time for the power supply for generating the microwaves for driving the microwave driven UV lamp, and FIG. 2(c) showing the UV light output of the lamp as a function of time.

DETAILED DESCRIPTION

Figure 3:
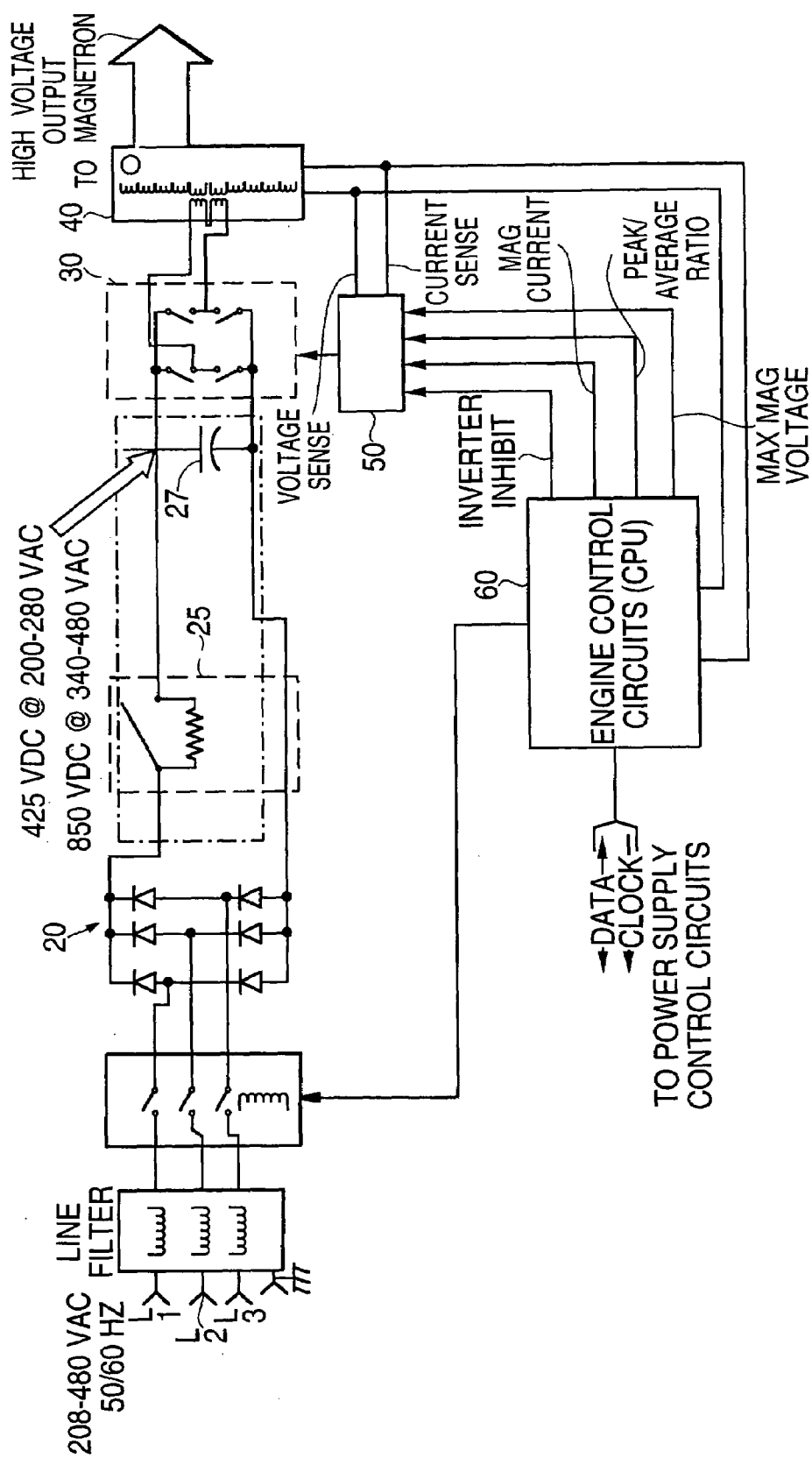
FIG. 3 is a circuit diagram of a direct current power supply which can be used, according to an illustrative embodiment of the present invention, in generating the microwaves driving a microwave driven lamp producing constant light output to initiate polymerization.

While the invention will be described in connection with specific and preferred embodiments, it will be understood that it is not intended to limit the invention to those embodiments. To the contrary, it is intended to cover all alterations, modifications and equivalents as may be included within the spirit and scope of the invention as defined by the appended claims.

Throughout the present specification, where materials, methods and apparatus are described as including or comprising specific components or structure or specific processing steps, it is contemplated by the inventor that materials, methods and apparatus of the present invention also consist essentially of, or consist of, the recited components or structure or recited processing steps.

The present invention, in illustrative aspects thereof, contemplates a free radical polymerization process, apparatus for performing the process and improved product formed. According to an illustrative process within the present invention, the composition containing a material (e.g., monomer or oligomer) to be polymerized by free radical polymerization, is irradiated with substantially constant radiation, substantially without pulsation, to, e.g., initiate and sustain the free radical polymerization, during the time period that the composition is being subjected to polymerization. This processing produces an improved product, having improved properties, and produces the product at higher speeds (higher throughput). Moreover, apparatus for producing the substantially constant radiation includes a radiation source (e.g., but not to be limiting, a source of light, such as ultraviolet light) producing the substantially constant radiation, substantially without pulsation; and, e.g., a direct current power supply which outputs a constant current used to generate the substantially constant radiation substantially without pulsation. Illustratively, the source of the radiation can be a microwave driven UV lamp, with the direct current power supply providing a constant current applied to a microwave generator to produce microwaves used to drive the UV lamp. Through use of the substantially constant radiation, substantially without pulsation, premature termination of the free radical polymerization can be at least reduced.

Premature termination describes the situation where growing macroradicals, in the formation of the polymer by the free radical polymerization mechanism, are terminated by small primary radicals from photolysis of the photoinitiator. This happens under pulsed irradiation, where the pulsing frequency is shorter than the time needed to reach "steady state" (steady state being that state where the rate of radical formation is equal to the rate of termination (rate of radical-radical coupling)). Growing macroradicals (propagation phase) will have a lower rate of termination, due to mobility restrictions caused by the very fast increase in viscosity of the polymerizing medium and the size of the macroradicals. After the first pulse of light, most of the primary radicals will promote propagation and, with the free radical polymerization, add into the double bond (for example, acrylate double bond, where the monomeric material being polymerized is an acrylate). With further short pulses, the remaining unphotolyzed photoinitiator will now start to produce new small primary radicals, which have a much higher mobility than the growing macroradicals. So, in essence these newly generated small primary radicals from a subsequent photolysis of the photoinitiator (arising from pulsed UV light) will promote biradical termination by coupling with growing macroradicals in competition with initiation of new chain growth, resulting in premature termination of the polymerization process.

By avoiding pulsed light, and using a constant light output, over time, without pulsation, according to the present invention, photolysis of photoinitiators which preferentially terminates polymerization is reduced. In addition, by using a constant current DC power supply to power the lamp providing the light (for example, to generate microwaves for driving the lamp, where the lamp is a microwave-driven electrodeless lamp; or to power an arc lamp), a constant light output (e.g., constant ultraviolet light output) can effectively be achieved, to reduce the above-described premature termination and at least reduce undesirable effects thereof.

While the present invention is described herein primarily in connection with free radical polymerization using photoinitiator activated by ultraviolet light, the present invention is not limited thereto. That is, the present invention includes use of constant light output, without any substantial pulsation or ripple, of other types of light (e.g., visible light, infrared light, etc.), and of other types of radiation, depending upon the energy (e.g., light energy) needed to activate the free radical polymerization (for example, and not to be limiting, to activate an initiator for initiating the free radical polymerization).

FIG. 1(a) shows the conventional technique for free radical polymerization of a composition which forms a work surface 7 (e.g., a coating on a substrate). This conventional technique uses a rectified alternating current or pulsed direct current power supply 1 for generating microwaves to drive microwave-driven UV lamp 3, to produce ultraviolet light 11 to activate photoinitiators in the composition forming work surface 7. FIG. 2(a) illustrates the present invention, using a DC power supply 5 for driving a microwave driven ultraviolet lamp 13 to produce ultraviolet light 15 to activate the photoinitiators in the composition forming work surface 7, to initiate free radical polymerization. FIGS. 1(b) and 2(b) respectively show the current produced by the power supplies 1, 5 as a function of time; and shown in FIGS. 1(c) and 2(c) are the light output 11, 15 respectively produced according to the conventional technique and according to the present invention, and applied to the work surface 7, as a function of time. The arrow designated by reference character 9 denotes the direction of movement of work surface 7 past the lamps 3, 13.

According to the conventional technique power supply 1 produces pulsed current, shown in FIG. 1(b); and ultraviolet light 11 produced by lamp 3 is pulsed, as seen in FIG. 1(c). This pulsed light causes premature termination of the free radical polymerization, as discussed previously.

As can be seen in FIGS. 2(b) and 2(c), according to the present invention a constant current is supplied from power supply 5, and produces a constant light output 15 from ultraviolet lamp 13 over time, applied to the work surface; as discussed previously, this reduces premature termination so as to at least reduce undesirable effects and provide increased yield and higher molecular weight products.

A DC power supply which can be utilized according to aspects of the present invention is shown in FIG. 3. This DC power supply is illustrative of a power supply which can be used in the present invention, and is not limiting of the present invention. This power supply illustratively provides a high voltage output, having a constant current over time, to, e.g., a magnetron, where the lamp is an electrodeless lamp driven by microwaves. The magnetron generates the microwaves for driving the lamp, which produces a light output which is constant over time. The DC power supply can also be used to power arc lamps.

More specifically, FIG. 3 shows a three-phase AC line voltage that is rectified by a three-phase bridge 20 after passing through line filters and contacts. The three-phase bridge 20 may provide a DC voltage to an H bridge 30. A pre-charge relay (and associated resistor) 25 and a capacitor 27 may be provided between the three-phase bridge 20 and the H bridge 30. The pre-charge relay (and associated resistor) 25 may prevent damage caused by in-rush current that is used to charge the capacitor 27. The bridge 30 may include four insulated gate bipolar transistors (IGBT) arranged as an H. In operation, two diagonal transistors of the H bridge 30 may conduct simultaneously for one half of a switching cycle and then the other diagonal transistors of the H bridge 30 may conduct for the remaining one half of the switching cycle. This operation may provide alternating current to the high voltage transformer and rectifier (HVTR) assembly 40. The transistors may operate at a high frequency (such as approximately 20 kHz) so that the size and the weight of the high voltage transformer can be reduced. The filtering components that smooth out the current to the magnetron may also be reduced when higher operating frequencies are used.

A phase shifter/pulse width modulator 50 may perform the control of the IGBT transistors. The inputs to the phase shifter/pulse width modulator 50 may be the magnetron current and voltage, which are measured on the HVTR assembly 40. The phase shifter/pulse width modulator 50 may adjust the control signals to the transistors so that it regulates either the current or the voltage at the output of the HVTR assembly 40. This process may be called feedback control.

The HVTR assembly 40 may include a multi-output transformer. Each output may be rectified with an individual rectifier and filter circuit. The filter circuit may include energy storage elements (such as inductors and capacitors) to smooth out the high frequency pulses and supply essentially DC current to the magnetron. The individual rectifier outputs may be series connected to generate the high voltage required by the magnetron.

An engine control circuit 60 may monitor and control the entire power supply as required. The engine control circuit may include a programmed microprocessor with necessary input/output circuitry to monitor internal voltages and currents.

The present invention is not limited to polymerization of any specific type of monomer(e.g., acrylates), and can be applied to any polymerization occurring by a free radical polymerization mechanism (that is, free radical systems). For example, any kind of free radical polymerizable C=C double bond, regardless of other structure in the molecule, will be more or less sensitive to premature termination, and such premature termination can be reduced by applying the present invention using a constant light output applied to the composition to be polymerized.

In the following will be discussed various groups of materials to which the present invention can be applied. However, it is to be emphasized that the following are only examples of, e.g., commercially available classes of reactive systems sensitive towards premature termination, since they undergo free radical polymerization, and the present invention is not to be limited to these classes of reactive systems.

A first class of materials to which the present invention is applicable is those which form homopolymers by free radical polymerization, that is, homopolymerization of the chain growth type. In this class, only one type of double bond is used; the double bond, however, can be chemically bonded to any kind of backbone, and any number of C=C double bonds can be attached to any backbone. Typical examples are acrylates and methacrylates. Styrene and styrene derivatives, N-vinyl amides, and vinyl esters are also typical examples of C=C structures which can be polymerized by free radical polymerization and benefit from use of the constant direct current power source providing constant light output over time, according to the present invention.

A second class of materials to which the present invention is applicable is those which form copolymers by copolymerization of the chain growth type. This uses different monomers or oligomers, discussed above in connection with homopolymerization, together. Mixtures of any number of different monomers or oligomers, in any ratio and any type of C=C double bond described above, can be used; depending on the reactivity ratio of the individual monomers/oligomers, the copolymer formed will have very different properties. Typical examples are acrylate/methacrylate, acrylate/unsaturated polyester and acrylate/N-vinyl amide.

A third class of materials to which the present invention is applicable is those which form copolymers by alternating copolymerization. In this case, any acceptor (A) type monomer or mixtures thereof, in any number and in any ratio, in a mixture (close to 1:1 on a molar ratio) with any donor type (D) monomer or mixtures thereof in any number and in any ratio, will undergo alternating copolymerization. For this case, there are an additional number of potential and commercially available monomers and oligomers containing C=C bonds with substituents previously not mentioned. These include A and D type monomers that will not undergo homopolymerization as discussed previously. Various acceptor and donor type monomers are described in connection with U.S. Pat. No. 5,446,073 to Jonsson, et al., the contents of which are incorporated herein by reference in their entirety. Typical examples are fumarate/vinyl ether, maleate/vinyl ether and maleimide/vinyl ether.

As seen in the foregoing, many different types of polymerization reactions, occurring through free radical polymerization, will benefit from the present invention. The foregoing classes are not the only materials that can be used, and other classes and types of materials can be utilized, as long as polymerization occurs through free radical polymerization.

The present invention is applicable to any polymerization technique which occurs by free radical polymerization. Monomers and oligomers can be polymerized according to the polymerization of the present invention. Monomers which can be polymerized according to the present invention include molecules containing at least one C=C, that can be polymerized by a free radical induced process. Such monomer can contain any number, in any ratio, of all kinds of C=C bonds, capable of undergoing a free radical polymerization.

In the following are set forth examples of various aspects of the present invention, together with comparisons for showing the better results achieved according to these aspects of the present invention. These examples according to the present invention use a constant current (over time), direct current power supply, and provide a constant light output applied to the composition to be polymerized; and are compared with examples using a variable power supply which provides irradiating light having a ripple (pulsed light). The compositions irradiated so as to undergo free radical polymerization were provided in a film thickness of 15 or 25 microns, which was controlled by a Teflon spacer or a wire-wound draw-down bar. The coated films were cured both in the presence of air and in the absence of air. Each film passed by the irradiating lamp at the stated speeds (fpm: feet per minute) set forth in the following Table 1. The compositions contained Irgacure 184, which is 1-hydroxycyclohexyl phenyl ketone, as a photoinitiator. The compositions contained the Irgacure 184 in amounts as set forth in the following, and contained isobornyl acrylate, HDDA (hexanediol diacrylate) or ethoxylated nonylphenol acrylate as the monomer which polymerizes by free radical polymerization. CHVE (cyclohexanedimethanol divinylether) and EMI (N-ethyl maleimide) can also be used as the monomer in free radical polymerization of the photoinitiator system.

The examples in the following, corresponding to the present invention, utilized an "OMNI" DC power supply (see the power supply diagram in FIG. 3) supplying a constant current to a microwave-driven ultraviolet light lamp, which irradiated the composition with a constant ultraviolet light output over time. The "VPS-3" power supply, for the comparative technique, provided a pulsed electric current which, when applied to the microwave driven ultraviolet light lamp, provided an ultraviolet light output that was pulsed (rippled).

From the following results, it can be seen that the double bond(C=C) conversion of formulations cured according to the present invention can be about 7% higher than that achieved using a comparative technique. As can be seen in the following, advantageous results achieved according to the present invention are particularly great at higher speeds of movement of the substrate having the coating film thereon, past the irradiating light.

TABLE 1

A. Homopolymerization - Isobornyl acrylate containing 0.25% Irgacure 184

|  | 25 fpm | 50 fpm | 100 fpm | 150 fpm | 200 fpm |
|---|---|---|---|---|---|
| VPS-3 | 91% | 89% | 84% | 69% | 51% |
|  | 91% | 90% | 82% | 67% | 44% |
|  | 92% | 90% | 84% | 69% | 44% |
|  |  |  |  |  | 52% |
| Average: | 91% | 90% | 83% | 68% | 48% |
| OMNI | 92% | 91% | 85% | 73% | 55% |
|  | 92% | 91% | 85% | 72% | 55% |
|  | 91% | 91% | 85% | 73% | 53% |
|  |  |  |  |  | 44% |
| Average: | 92% | 91% | 85% | 73% | 52% |

TABLE 2

B. Homopolymerization - Isobornyl acrylate containing 2% Irgacure 184

|  | 25 fpm | 50 fpm | 100 fpm | 150 fpm |
|---|---|---|---|---|
| VPS-3 | 96% | 95% | 91% | 87% |
|  | 96% | 95% | 92% | 88% |
|  | 96% | 96% | 92% | 86% |
| Average: | 96% | 95% | 92% | 87% |
| OMNI | 96% | 95% | 92% | 90% |
|  | 96% | 95% | 92% | 90% |
|  | 97% | 95% | 91% | 90% |
| Average: | 96% | 95% | 92% | 90% |

TABLE 3

C. Homopolymerization - Hexanediol diacrylate (HDDA) containing 0.125% Irgacure 184

|  | 25 fpm | 50 fpm | 100 fpm | 150 fpm |
|---|---|---|---|---|
| VPS-3 | 85% | 80% | 65% | 42% |
|  | 87% | 81% | 62% | 45% |
|  | 86% | 83% | 60% | 39% |
|  |  |  |  | 41% |
| Average: | 86% | 81% | 62% | 42% |
| OMNI | 86% | 84% | 66% | 46% |
|  | 86% | 83% | 68% | 49% |
|  |  | 84% | 66% | 46% |
|  |  |  |  | 53% |
| Average: | 86% | 84% | 67% | 49% |

TABLE 4

D. Homopolymerization - Ethoxylated nonylphenol acrylate containing 0.3% Irgacure 184
Difference of double bond conversion using OMNI and VPS-3 at different cure speed

|  | 75 fpm | 100 fpm | 125 fpm | 150 fpm |
|---|---|---|---|---|
| VPS-3 | 78.1% | 62.5% | 57.4% | 53.3% |
|  | 77.6% | 66.7% | 53.9% | 50.5% |
|  | 80% | 67.1% | 58.6% | 47.6% |
|  | 78.6% | 68.2% | 58.5% | 45.9% |
|  | 76% | 63.9% | 52.9% | 49.9% |
| Average: | 78.1% | 65.7% | 56.3% | 49.4% |
| OMNI | 74.8% | 63.8% | 59% | 50.3% |
|  | 77.9% | 72.2% | 63.6% | 50.1% |
|  | 81.2% | 71.7% | 62.2% | 50.9% |
|  | 85.9% | 69% | 62.5% | 52.6% |
|  | 78.4% | 66.4% | 57.3% | 52.7% |
| Average: | 79.6% | 68.6% | 60.9% | 51.3% |

TABLE 5

E. Copolymerization - Isobornyl acrylate/1,6-HDDA (1:1 molar ratio) containing 0.2% Irgacure 184
Difference of double bond Conversion using OMNI and VPS-3 at different cure speeds

|  | 50 fpm | 75 fpm | 100 fpm | 125 fpm | 150 fpm |
|---|---|---|---|---|---|
| VPS-3 | 89.6% | 83.9% | 80.4% | 70.2% | 54% |
|  | 89.9% | 84.9% | 73.6% | 71.1% | 50.9% |
|  | 88.9% | 84.3% | 79.1% | 67.4% | 50.4% |
|  | 87.3% | 86.3% | 77.7% | 58% | 46.9% |
|  | 91.4% | 86.8% | 79.7% | 61.2% | 41.1% |
| Average: | 89.4% | 85.2% | 78.1% | 65.6% | 48.7% |
| OMNI | 90.9% | 83.8% | 82.8% | 71% | 59% |
|  | 90.4% | 86.9% | 83.3% | 77.3% | 54.6% |
|  | 90.9% | 87.8% | 2.1% | 72.6% | 50.6% |
|  |  | 85.7% | 80.9% | 76.5% | 49.2% |
|  |  | 89.5% | 82.1% | 64% | 47.9% |
| Average: | 90.7% | 86.7% | 82.2% | 72.3% | 52.3% |

TABLE 6

F. Alternating Copolymerization - Cyclohexanedimethanol divinylether/N-ethyl maleimide (1:2 molar ratio)
Difference of double bond conversion using OMNI and VPS-3 at different cure speeds

|  | 75 fpm | 100 fpm | 125 fpm |
|---|---|---|---|
| VPS-3 (maleimide) | 86.3% | 76.4% | 73.5% |
|  | 88.8% | 79.9% | 74.2% |
|  | 70.7% | 74.4% | 69.2% |
|  | 80.5% | 88.6% | 77.1% |
|  | 79.8% | 63% |  |
| Average: | 81.2% | 76.5% | 73.5% |
| VPS-3 (vinylether) | 61.0% | 57% | n/a |
|  | 59.2% | 57% |  |
|  | 51.6% | 56% |  |
|  | 56.3% | 67.7% |  |
|  | 55.5% | 44.2% |  |
| Average: | 56.7% | 56.4% |  |
| OMNI (maleimide) | 91% | 79.2% | 74.7% |
|  | 94.6% | 82.9% | 82.5% |
|  | 78.2% | 73.8% | 82.8% |

TABLE 6-continued

F. Alternating Copolymerization - Cyclohexanedimethanol divinylether/N-ethyl maleimide (1:2 molar ratio) Difference of double bond conversion using OMNI and VPS-3 at different cure speeds

|  | 75 fpm | 100 fpm | 125 fpm |
|---|---|---|---|
|  | 89.9% | 94% | 76.2% |
|  | 82.7% | 81.8% |  |
| Average: | 87.3% | 82.3% | 79.1% |
| OMNI | 64.5% | 61.8% | 57.5% |
| (vinylether) | 68.8% | 65.4% | 59.4% |
|  | 60% | 53.6% | 59.8% |
|  | 65.1% | 63.1% | 58.9% |
|  | 62.2% | 60.4% |  |
| Average: | 64.1% | 60.9% | 58.9% |

In Tables 7 and 8 are shown a comparison of Gel Permeation Chromotography (GPC) measurements made on samples cured using an "OMNI" power supply, according to the present invention, and, as a comparison, using the "VPS-3" power supply. The resulting molecular weight (MW) distribution clearly shows a much more narrow distribution for samples cured using the "OMNI" power supply. This is due to the fact that the fraction of short polymer chains is much smaller when the "OMNI" power supply is used.

TABLE 7

G. GPC results of Isobornyl acrylate/Irgacure 184 (0.25%), cured with Nitrogen Inerting at different curing speeds

|  | Retention time (min.) | Mw | Mw* | d(peak width) |
|---|---|---|---|---|
| VPS-3/HP6(10 fpm) | 15.392 | 94177 | 106889 | 3.1280 |
| OMNI/HP6(10 fpm) | 15.450 | 90079 | 103974 | 3.0639 |
| VPS-3/HP6(200 fpm) | n/a | n/a | 230923 | 4.8724 |
| OMNI/HP6(200 fpm) | n/a | n/a | 197038 | 4.7655 |

Mw is an average molecular weight at retention time.
Mw* is a whole average molecular weight distribution.

TABLE 8

H. GPC results of Isobornyl acrylate/Irgacure 184 (2%), cured under air at different curing speeds

|  | Retention time (min.) | Mw | Mw* | d(peak width) |
|---|---|---|---|---|
| VPS-3/HP6(10 fpm) | 15.945 | 62405 | 68089 | 2.2914 |
| OMNI/HP6(10 fpm) | 15.990 | 60357 | 68408 | 2.1793 |
| VPS-3/HP6(20 fpm) | 16.186 | 52193 | 56010 | 2.2848 |
| OMNI/HP6(20 fpm) | 16.239 | 50182 | 55842 | 2.2150 |
| VPS-3/HP6(200 fpm) | 17.240 | 23889 | 50471 | 2.4988 |
| OMNI/HP6(200 fpm) | 17.237 | 23942 | 43293 | 2.2061 |

Mw is an average molecular weight at retention time.
Mw* is a whole average molecular weight distribution.

Accordingly, by the present invention, utilizing constant output radiation (for example, constant output light, such as ultraviolet light, but not limited thereto; other initiating light, such as infrared and visible light can be utilized), premature termination of the polymerization can be reduced. Moreover, conversion of monomer to the polymer can be improved, particularly at high rates of speed of the composition past the irradiating light, molecular weight of the produced polymer can be improved (increased) and the distribution (range) of molecular weights in the polymer product reduced, and physical and other properties of the produced polymer can be improved.

What is claimed is:

1. Free radical polymerization method, comprising:
   providing a composition containing a material that can be polymerized by free radical polymerization; and
   polymerizing said material in said composition by irradiating said composition with radiation generated by a lamp driven by a DC power supply so as to initiate and maintain said free radical polymerization, wherein said composition is irradiated with a substantially constant radiation, over time, substantially without pulsation, during said polymerizing.

2. Method according to claim 1, wherein said lamp produces ultraviolet light, the composition being irradiated with the ultraviolet light so as to initiate and maintain the free radical polymerization.

3. Method according to claim 2, wherein the lamp is an electrodeless lamp.

4. Method according to claim 1, wherein said lamp is excited, to produce said radiation, by microwaves, the microwaves being generated by a microwave source powered by said DC power supply.

5. Method according to claim 4, wherein said lamp is an electrodeless lamp.

6. Method according to claim 1, wherein said lamp is an arc lamp.

7. Apparatus for performing free radical polymerization, comprising:
   support structure for holding a composition that can be polymerized by free radical polymerizaton;
   a lamp for irradiating the composition with radiation so as to initiate and maintain the free radical polymerization, the lamp being adapted to provide a substantially constant radiation output, over time, substantially without pulsation, for irradiating the composition when performing the free radical polymerization; and
   a DC power supply for driving said lamp.

8. Apparatus according to claim 7, wherein said lamp is a lamp generating ultraviolet light, whereby said radiation is ultraviolet light.

9. Apparatus according to claim 7, wherein said lamp is an arc lamp.

10. Apparatus according to claim 7, wherein said lamp is an electrodeless lamp and wherein said apparatus further comprises a microwave source, the electrodeless lamp being excited by microwaves from said microwave source, and said microwave source being powered by said DC power supply.

11. Apparatus according to claim 10, wherein said microwave source is a magnetron.

* * * * *